United States Patent
DeSiena

(10) Patent No.: US 9,340,334 B2
(45) Date of Patent: May 17, 2016

(54) SEALABLE CONTAINER FOR HOUSEHOLD USE

(71) Applicant: MEDport LLC, Providence, RI (US)

(72) Inventor: Jessica DeSiena, Providence, RI (US)

(73) Assignee: Fit & Fresh, Inc., Indianapolis, IN (US)

( * ) Notice: Subject to any disclaimer, the term of this patent is extended or adjusted under 35 U.S.C. 154(b) by 544 days.

(21) Appl. No.: 13/777,613

(22) Filed: Feb. 26, 2013

(65) Prior Publication Data

US 2013/0233855 A1 Sep. 12, 2013

Related U.S. Application Data

(60) Provisional application No. 61/609,201, filed on Mar. 9, 2012.

(51) Int. Cl.
*B65D 45/16* (2006.01)
*A47J 41/00* (2006.01)
*B65D 21/02* (2006.01)
*B65D 43/02* (2006.01)
*B65D 51/28* (2006.01)
*F25D 3/08* (2006.01)

(52) U.S. Cl.
CPC .............. *B65D 45/16* (2013.01); *A47J 41/0044* (2013.01); *A47J 41/0061* (2013.01); *B65D 21/022* (2013.01); *B65D 43/0218* (2013.01); *B65D 51/28* (2013.01); *A47J 41/0088* (2013.01); *B65D 2543/00101* (2013.01); *B65D 2543/00518* (2013.01); *B65D 2543/00537* (2013.01); *B65D 2543/00555* (2013.01); *B65D 2543/00842* (2013.01); *F25D 3/08* (2013.01); *F25D 2303/0844* (2013.01); *F25D 2303/08221* (2013.01); *F25D 2303/08222* (2013.01)

(58) Field of Classification Search
CPC .............. A47J 41/0044; A47J 41/0083; A47J 41/0088; A47J 41/0061; B65D 21/022–21/0223; F25D 2303/00; F25D 2303/08; F25D 2303/082; F25D 2303/0821; F25D 2303/0822; F25D 2303/08221; F25D 2303/084; F25D 2303/0844; F25D 2303/0845; F25D 3/08; A45C 11/20; A01N 1/2063; A01N 1/2073
See application file for complete search history.

(56) References Cited

U.S. PATENT DOCUMENTS

| | | | | |
|---|---|---|---|---|
| 2,412,325 | A * | 12/1946 | Devine et al. | 206/508 |
| 3,255,607 | A * | 6/1966 | Bair et al. | 62/372 |
| 3,387,650 | A * | 6/1968 | Masshake et al. | 165/75 |
| 4,024,731 | A * | 5/1977 | Branscum | 62/457.2 |
| 4,213,310 | A * | 7/1980 | Buss | 62/457.2 |
| 4,483,157 | A * | 11/1984 | Human | 62/400 |
| 4,498,312 | A * | 2/1985 | Schlosser | 62/457.2 |
| 4,700,842 | A | 10/1987 | Grusin | |
| 5,312,011 | A | 5/1994 | Fischer | |

(Continued)

*Primary Examiner* — Anthony Stashick
*Assistant Examiner* — Mollie Llewellyn
(74) *Attorney, Agent, or Firm* — Cook Alex Ltd.

(57) ABSTRACT

This concerns sealable containers for household use that combine a container for food, beverages and the like with a lid for closing the container in a tightly sealed manner. The container bottom on the outside has a downwardly projecting flange within which is an open outside volume, while the lid top on the outside has an upwardly projecting raised panel with a sidewall. The raised panel of the lid snappingly and realeasably fits into the outside volume at the bottom of the container, by virtue of which the lid snaps onto the container bottom, creating a stackable situation. Also, the lid can contain on its inside a temperature-maintenance block such as a freezer pack that affects temperature within the container.

21 Claims, 12 Drawing Sheets

(56) References Cited

U.S. PATENT DOCUMENTS

| | | |
|---|---|---|
| 5,409,126 A | 4/1995 | DeMars |
| 5,409,128 A | 4/1995 | Mitchell |
| 5,421,172 A * | 6/1995 | Jones ........................ 62/457.5 |
| 5,624,051 A | 4/1997 | Ahern, Jr. et al. |
| D388,325 S | 12/1997 | Tucker et al. |
| 5,692,617 A | 12/1997 | Adams |
| 5,699,925 A | 12/1997 | Petruzzi |
| 5,704,485 A * | 1/1998 | Cautereels et al. ........... 206/546 |
| D390,109 S | 2/1998 | Tucker et al. |
| 5,715,962 A * | 2/1998 | McDonnell .................. 220/4.03 |
| 5,718,350 A | 2/1998 | Williams |
| 5,769,229 A | 6/1998 | Andress et al. |
| 5,799,792 A | 9/1998 | Abrums |
| 5,960,708 A * | 10/1999 | DeTemple et al. .............. 99/472 |
| D420,548 S | 2/2000 | Loew et al. |
| 6,112,899 A | 9/2000 | Zeringue |
| 6,149,005 A * | 11/2000 | Rusconi ....................... 206/545 |
| 6,151,910 A | 11/2000 | Hazen |
| 6,152,318 A | 11/2000 | Walker |
| 6,164,483 A | 12/2000 | Walker |
| 6,170,696 B1 | 1/2001 | Tucker et al. |
| 6,276,162 B1 * | 8/2001 | Schemel ...................... 62/457.2 |
| 6,467,647 B1 | 10/2002 | Tucker et al. |
| 6,843,062 B2 * | 1/2005 | Crete ............................... 62/60 |
| 6,886,694 B2 | 5/2005 | McNeeley et al. |
| 7,040,115 B1 * | 5/2006 | Lopez et al. ................. 62/457.2 |
| 7,097,066 B2 | 8/2006 | Tucker et al. |
| 7,162,890 B2 * | 1/2007 | Mogil et al. ................. 62/457.7 |
| 7,261,219 B2 | 8/2007 | Tucker et al. |
| 7,264,135 B2 | 9/2007 | Savicki et al. |
| 7,303,075 B2 | 12/2007 | Herbert et al. |
| D568,693 S | 5/2008 | Furlong |
| D568,694 S | 5/2008 | Furlong |
| 7,392,907 B2 | 7/2008 | Herbert et al. |
| D585,699 S | 2/2009 | Furlong |
| D586,179 S | 2/2009 | Furlong |
| D612,196 S | 3/2010 | Furlong |
| D613,111 S | 4/2010 | Furlong |
| D615,349 S | 5/2010 | Furlong |
| 7,726,483 B2 | 6/2010 | Ramanujam et al. |
| 7,753,206 B2 | 7/2010 | Sawhney et al. |
| 7,950,249 B1 * | 5/2011 | White et al. .................... 62/464 |
| 8,071,923 B2 | 12/2011 | McMahan |
| D652,672 S | 1/2012 | Easton |
| D652,686 S | 1/2012 | Lindsay et al. |
| 8,118,190 B2 | 2/2012 | Coonce |
| 8,157,123 B2 | 4/2012 | Tucker et al. |
| D660,091 S | 5/2012 | Chen |
| D660,093 S | 5/2012 | Kyung |
| 8,205,749 B2 | 6/2012 | Korpanty et al. |
| D665,674 S | 8/2012 | Wu |
| 8,245,870 B2 | 8/2012 | McKinney et al. |
| D666,875 S | 9/2012 | Rusnak |
| D666,876 S | 9/2012 | Rusnak |
| D667,702 S | 9/2012 | Gilbert |
| 8,267,278 B2 | 9/2012 | Tucker et al. |
| D669,744 S | 10/2012 | Cossu |
| D671,373 S | 11/2012 | Kimmel et al. |
| 8,317,044 B2 | 11/2012 | Wu et al. |
| 8,322,530 B2 | 12/2012 | Furlong |
| 8,342,349 B2 | 1/2013 | Lu |
| 8,342,354 B2 | 1/2013 | Letica |
| 8,348,511 B2 | 1/2013 | Broering et al. |
| 8,424,319 B2 * | 4/2013 | Whewell, Jr. ...................... 62/62 |
| 2003/0230110 A1 * | 12/2003 | Linberg et al. ............... 62/457.1 |
| 2007/0187277 A1 | 8/2007 | Furlong |
| 2007/0295631 A1 | 12/2007 | Lin et al. |
| 2008/0000795 A1 | 1/2008 | Deakin et al. |
| 2008/0023364 A1 | 1/2008 | Krueger |
| 2009/0000977 A1 | 1/2009 | Coonce |
| 2009/0173656 A1 | 7/2009 | Furlong |
| 2009/0223853 A1 | 9/2009 | Kim |
| 2010/0005827 A1 * | 1/2010 | Winkler ....................... 62/457.2 |
| 2010/0025281 A1 | 2/2010 | Baker et al. |
| 2010/0059199 A1 | 3/2010 | Court |
| 2010/0065461 A1 | 3/2010 | Chhay |
| 2010/0170824 A1 | 7/2010 | Ramanujam et al. |
| 2010/0170897 A1 | 7/2010 | Gold et al. |
| 2010/0176022 A1 | 7/2010 | Furlong |
| 2010/0236967 A1 | 9/2010 | Peterman et al. |
| 2011/0203297 A1 * | 8/2011 | Oberweis .......................... 62/56 |
| 2012/0000954 A1 | 1/2012 | Shea et al. |
| 2012/0005129 A1 | 1/2012 | Phillips et al. |
| 2013/0340467 A1 * | 12/2013 | Kiedaisch et al. ........... 62/457.2 |

* cited by examiner

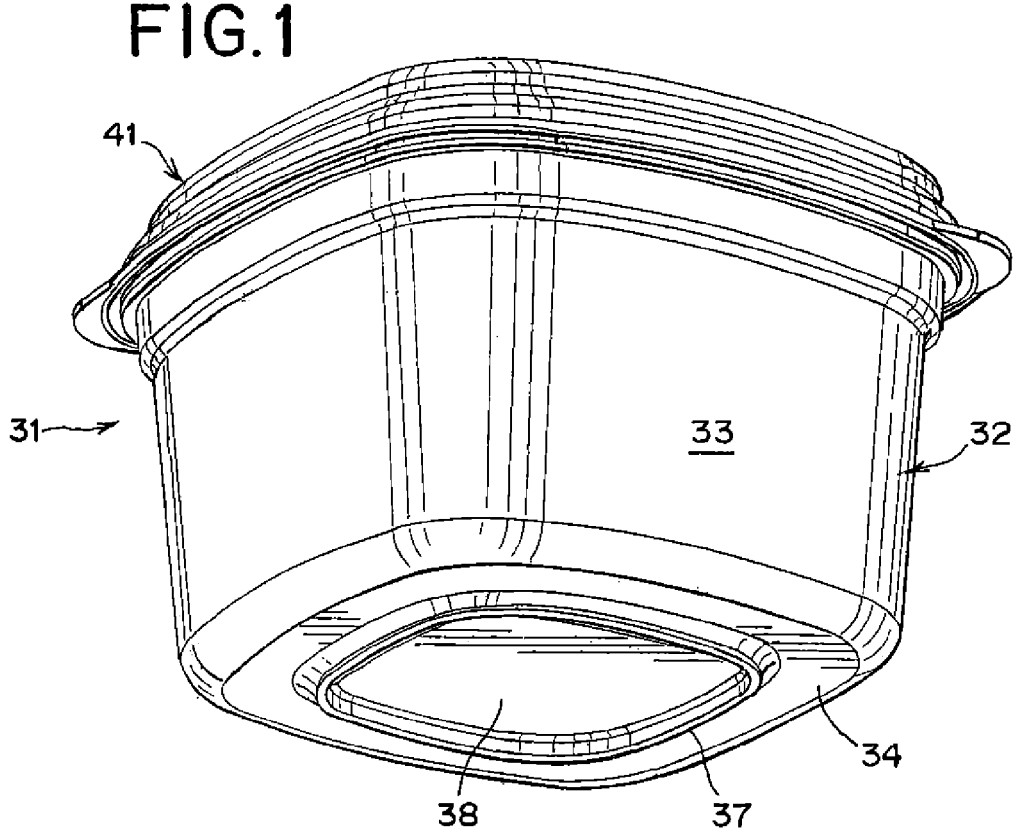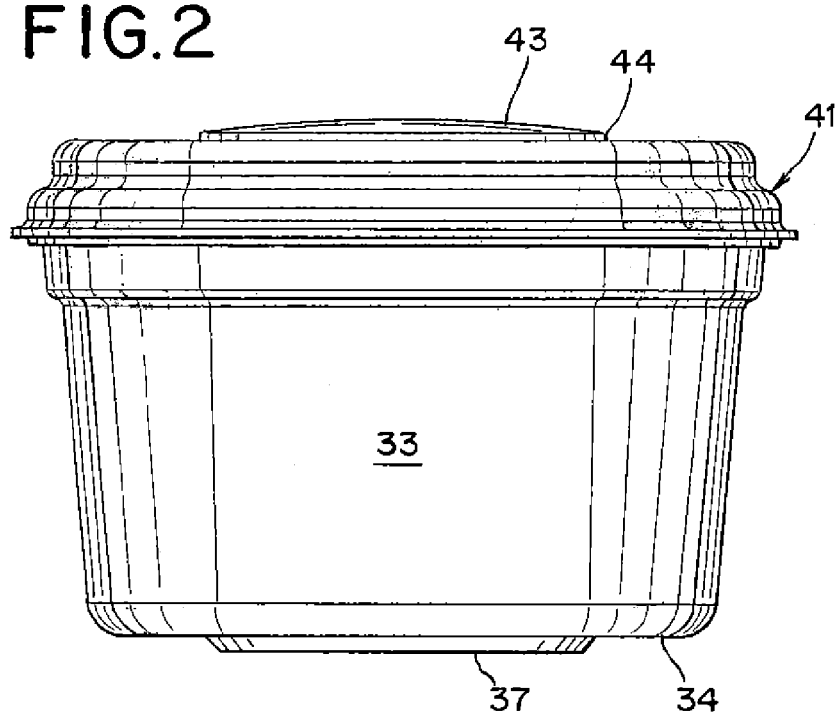

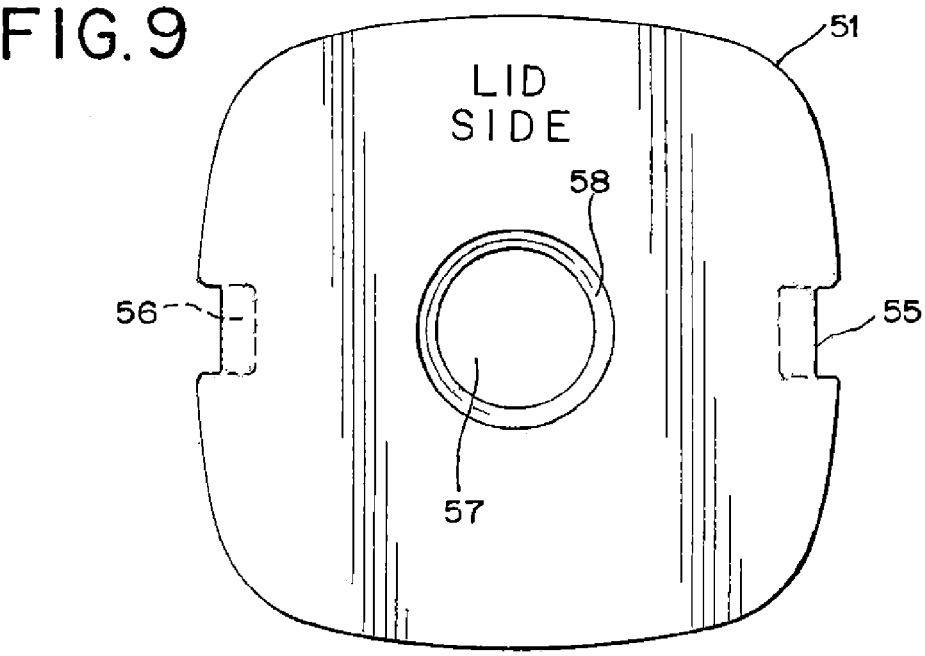
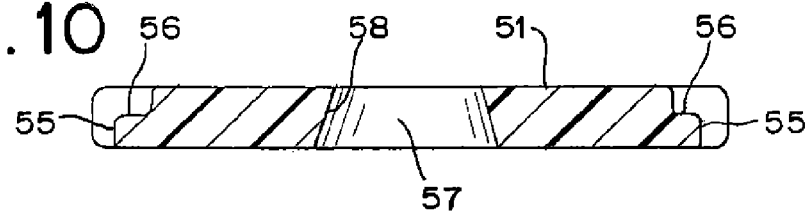
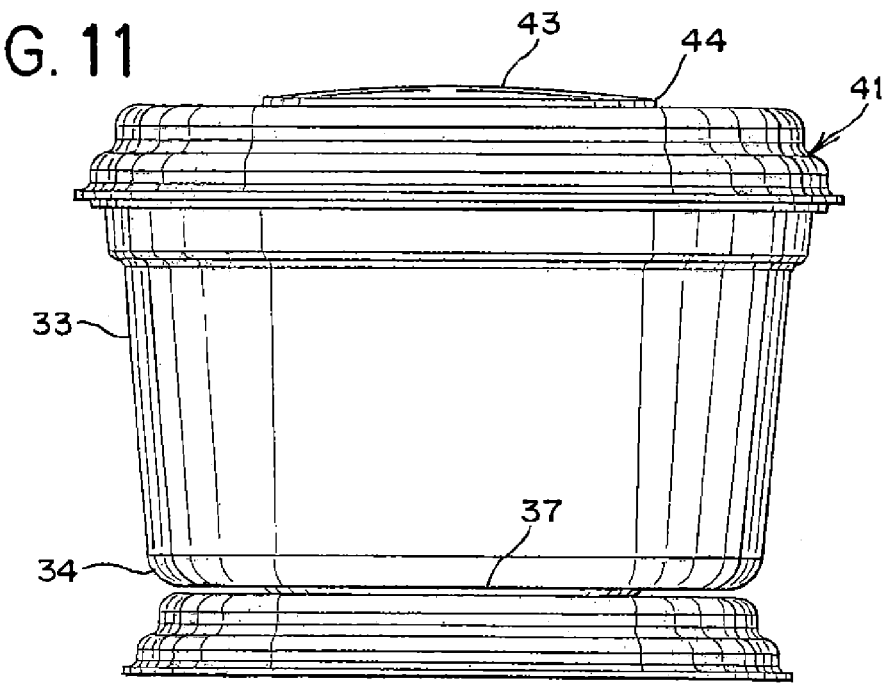

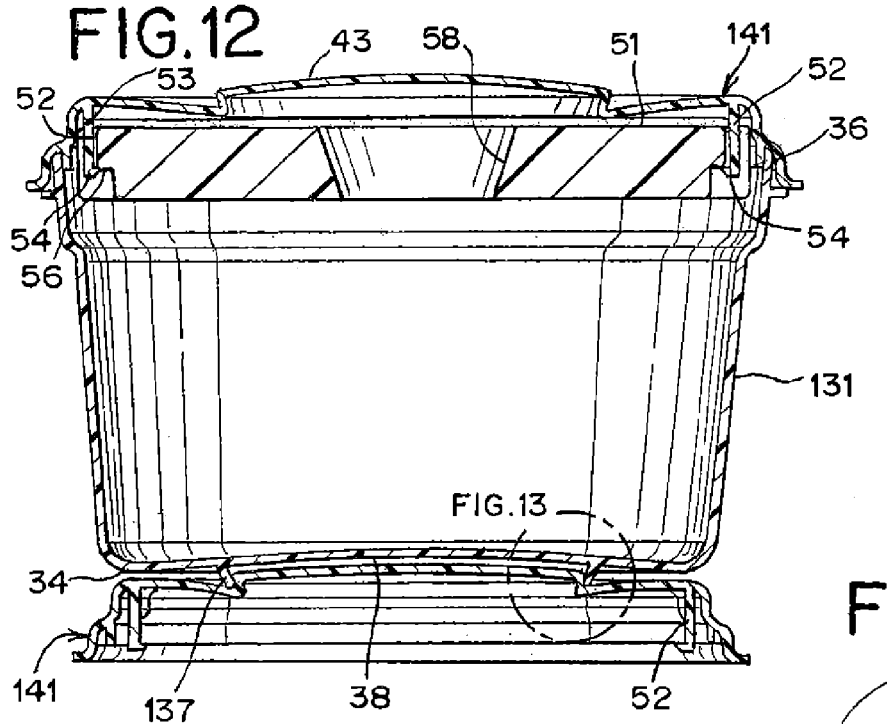
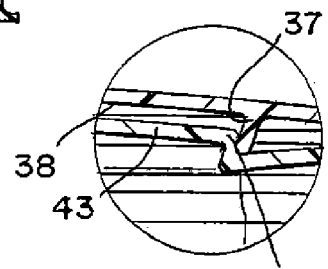
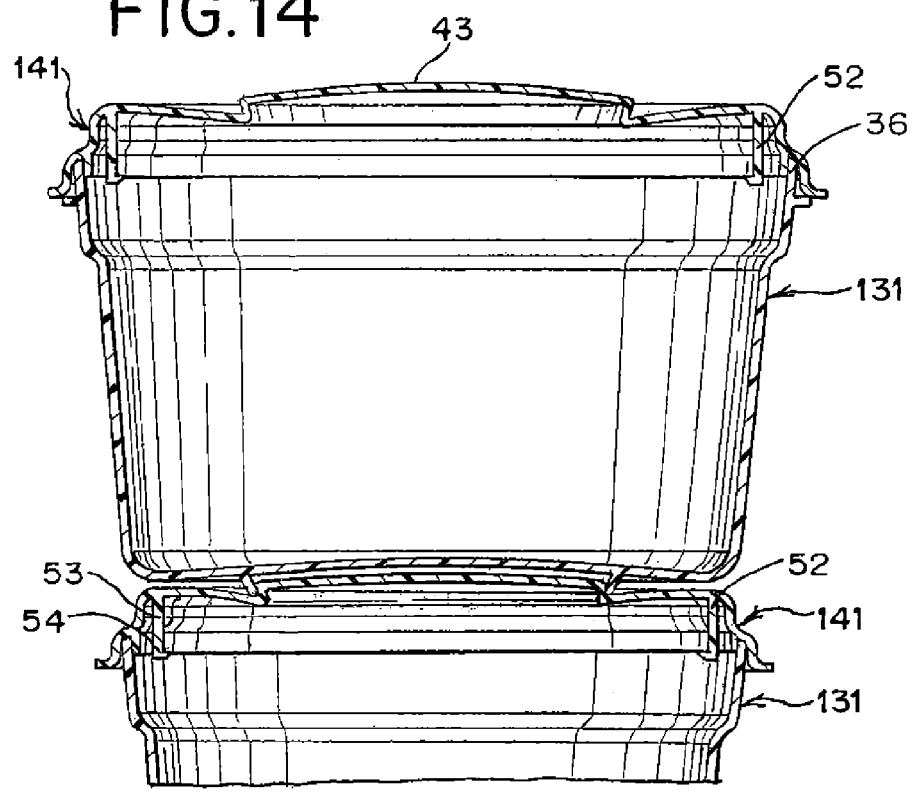

SEALABLE CONTAINER FOR HOUSEHOLD USE

CROSS REFERENCE TO RELATED APPLICATION

The present application claims the benefit of U.S. Provisional Patent Application Ser. No. 61/609,201, filed Mar. 9, 2012, which is incorporated herein in its entirety.

TECHNICAL FIELD

The present subject matter relates to containers and lids therefor which provide for secure and inter-engaging stacking of container bottoms onto lid tops. This allows multiple containers closed with respective lids to be stacked one on top of another. Included in the technical field are containers with freezer packs or other temperature-maintenance units that can be included in sealable containers for household use that also can include internal compartments for separate storage capability.

BACKGROUND

Numerous containers that are available for household use include containers that have lids to seal foods, beverages or other materials therewithin, such as meals, lunches and leftovers. Containers and lids of this type also have a function for use in transporting food and beverage products outside of the home. Lid and container combinations of these types are useful in organizing households and transporting meals and the like. Some have features that allow various containers, lids or both to nest within each other; others have features that include inter-engagement structures to provide engaged stacking of a group of containers or of a group of lids. Also generally known is the use of so-called freezer blocks or pouches that are put into a frozen state within a freezer or refrigerator freezer compartment and thereafter are placed into containers for foods or the like, such as within insulated bags, chests, coolers or the like in order to provide a source of cooling to help maintain for a longer time period the contents of the container at a temperature better suited for the food product.

SUMMARY

There are several aspects of the present subject matter which may be embodied separately or together in the containers and lids and assemblies thereof described and claimed herein. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, the container made of a polymeric material which has interior storage space of a definite volume and is combined with a lid that snaps or clicks onto the lip of the container, the lid itself incorporating therewithin a refrigerated block so as to maintain temperature of the contents of the volume from increasing to a potentially dangerous level for a selected period of time. typically including arrangements for securing a refrigerated block within the interior of the lid.

In another aspect, the volume of a container made of a polymeric material is sealingly enclosed by a lid made of polymeric material, this aspect having an arrangement for suspending a cooling or warming block to change and/or to help maintain the temperature within the lid portion and the container to which it is removably attached generally opposite to and above food materials within the container volume in need of temperature maintenance.

In yet another aspect, multiple assemblies or combinations of lids and containers are sized, structured, adapted and/or configured in order to be inter-engageable with each other to provide for secure stacking in a manner such that an outside lid of a first combination lid and container engages with a bottom of a container of a second lid and container combination that rests upon the first lid and container combination.

In a further aspect, a lid of a lid and container combination is provided with a draft or undercut angle edge around the entire periphery of the lid in order to hold the refrigerant block or the like in place during use.

In yet a further aspect, a lid of a lid and container sealable combination includes tabs extending downwardly into the volume of the container, which tabs snappingly engage a refrigerant block or other temperature-maintenance component.

In a further aspect, a container and lid combination is provided having an open-mouthed container with a sidewall and a bottom wall defining an inside volume and an open mouth for accommodating and containing products, particularly food or beverage products, the sidewall having an upstanding peripheral lip opposite the bottom wall. The lid is for closing the container and has a lower inner surface with a groove snappingly engageable with the peripheral lip of the container. The container has a bottom outer surface, the bottom outer surface having an outwardly protruding flange and an open outside volume inward of the flange. The lid has an upper outer surface and a lower inner surface, the upper outer surface having a raised panel, the raised panel having a sidewall member that spaces the raised panel outwardly from at least a portion of the lid upper outer surface. At least one portion of the outwardly projecting flange of the container or the sidewall member of the lid has an interference member, and the outside open volume of the container bottom is sized and shaped to closely receive the raised panel of the lid upper outer surface, whereby the interference member achieves snapping engagement with the container resting on top of the lid.

In another aspect, a container and lid combination is provided having an open-mouthed container with a sidewall and a bottom wall defining an inside volume and an open mouth for accommodating and containing products, particularly food or beverage products, the sidewall having an upstanding peripheral lip opposite the bottom wall. The lid is for closing the container and has a lower inner surface with a groove snappingly engageable with the peripheral lip of the container. The container has a bottom outer surface, the bottom outer surface having at least one outwardly protruding flange and an open outside volume inward of the flange. The lid has an upper outer surface and a lower inner surface, the upper outer surface having a raised panel, the raised panel having a sidewall member that spaces the raised panel outwardly from at least a portion of the lid upper outer surface. At least one outwardly projecting flange of the container or the sidewall member of the lid has an interference member, and the outside open volume of the container bottom is adapted, sized and shaped to closely receive the raised panel of the lid upper outer surface, whereby the interference member achieves snapping engagement with the container resting on top of the lid. Also, the lid includes a temperature-maintenance block and an engagement member of its said lower inner surface, whereby interaction between the engagement member and the block removably affixes the block to the lid, the temperature-maintenance block having a food side that faces the inside volume of the container and a lid side that faces the lower inner surface of the lid.

In still another aspect, a container and lid combination is provided having an open-mouthed container with a sidewall and a bottom wall defining an inside volume and an open mouth for accommodating and containing products, particularly food or beverage products, the sidewall having an upstanding peripheral lip opposite the bottom wall. The lid is for closing the container and has a lower inner surface with a groove snappingly engageable with the peripheral lip of the container. The container has a bottom outer surface, the bottom outer surface having an outwardly protruding flange and an open outside volume inward of the flange. The lid has an upper outer surface and a lower inner surface, the upper outer surface having a raised panel, the raised panel having a sidewall member that spaces the raised panel outwardly from at least a portion of the lid upper outer surface. At least one portion of the outwardly projecting flange of the container or the sidewall member of the lid has an interference member, and the outside open volume of the container bottom is sized and shaped to closely receive the raised panel of the lid upper outer surface, whereby the interference member achieves snapping engagement with the container resting on top of the lid. Also, the lid includes a temperature-maintenance block and an engagement member of its said lower inner surface, whereby interaction between the engagement member and the block removably affixes the block to the lid, the temperature-maintenance block having a food side that faces the inside volume of the container and a lid side that faces the lower inner surface of the lid. An insert tray of the container is sized and shaped to enter the container through its open mouth, the tray having a floor and providing an interior volume separate from the inside volume of the container, the container sidewall having a stop location that engages the insert tray whereby the insert tray is positioned at a desired height along the container sidewall. An additional temperature-maintenance block and additional engagement members are on the insert tray floor, which engagement members removably suspend the additional block from the insert tray, whereby two separate temperature-maintenance blocks are supported within the inside volume of the container.

In a further aspect, a combination container and lid include a lid with a raised panel surrounded by a channel having an upwardly and outwardly extending lip. The outside bottom wall of the container has complementary members that function as grippers for snapping engagement between the grippers of the container resting on top of the lid, snapping engagement between the channel and lip of the lid therebelow being achieved, while the lid typically is secured onto another container in order to provide secure stacking of container and lid assembly onto another container and lid assembly.

BRIEF DESCRIPTION OF THE DRAWINGS

FIG. 1 is a perspective view, taken from the bottom of a container and lid combination, with the lid sealingly in place;

FIG. 2 is a side elevational view of the lid and container combination depicted in FIG. 1;

FIG. 9 is a plan view of the LID SIDE, which is the side that faces the inside surface of the lid, of the temperature-maintenance block of FIG. 6;

FIG. 10 is a cross-sectional view through this embodiment of the temperature-maintenance block, taken along the line 10-10 of FIG. 8;

FIG. 11 is a side elevational view of an embodiment of container and lid combination, showing the bottom of the container snappingly engaged with the top of a lid;

FIG. 12 is a longitudinal cross-sectional view through FIG. 11;

FIG. 13 is a detailed cross-sectional view at the circled location in FIG. 12 designated by FIG. 13;

FIG. 14 is a cross-sectional view similar to FIG. 12 but in which the temperature-maintenance block is not present and illustrating stacking of multiple container and lid combinations;

DETAILED DESCRIPTION OF THE ILLUSTRATED EMBODIMENTS

The embodiments disclosed herein are exemplary only, and the subject matter described herein may be embodied in various forms. Therefore, specific details disclosed herein are not to be interpreted as limiting the subject matter as defined in the accompanying claims.

Figure 3:
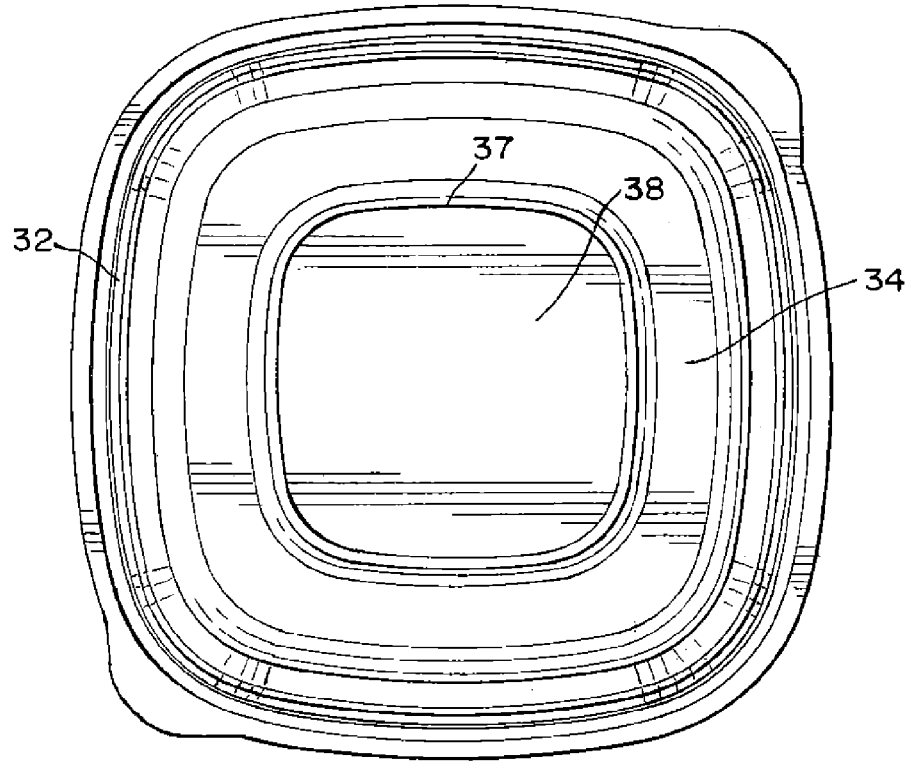
FIG. 3 is a bottom plan view of the combination depicted in FIG. 1, showing an embodiment of an inter-engagement member on the outside bottom of the container.
Figure 4:
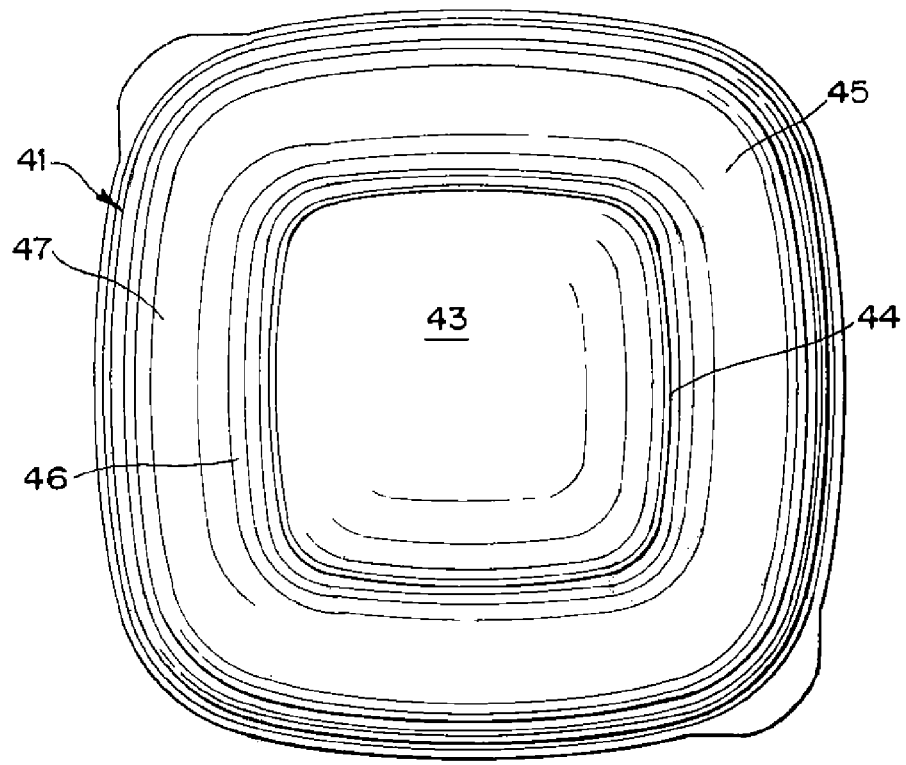
FIG. 4 is a top plan view of the combination depicted in FIG. 1, showing an embodiment of an inter-engagement member on the outside top of the lid.
Figure 5:
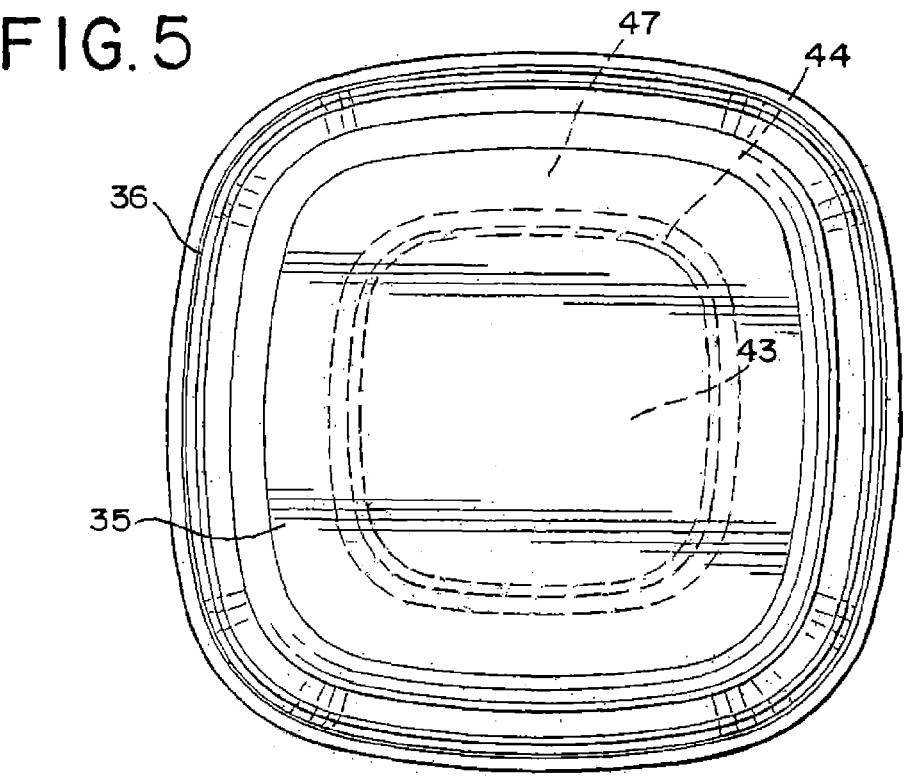
FIG. 5 is a top plan view of the container of FIG. 1, shown with the lid removed from the container.

FIG. 1, FIG. 2, FIG. 3, FIG. 4 and FIG. 5 depict a first embodiment of a container and lid combination, generally designated at 31. The container, generally designated at 32, has a sidewall 33 and a bottom wall 34 defining an inside volume 35 (FIG. 5). The sidewall has a lip 36 along the outside perimeter top portion of the container 32. This is an upstanding peripheral lip that surrounds the open mouth of the container. Outside surface 34 of the bottom wall includes an outwardly protruding flange 37, as well as an open outside volume 38 inward of the flange. While a single continuous flange is shown, multiple spaced flanges could instead be provided generally within the footprint of the flange shown in FIG. 1.

Figure 6:
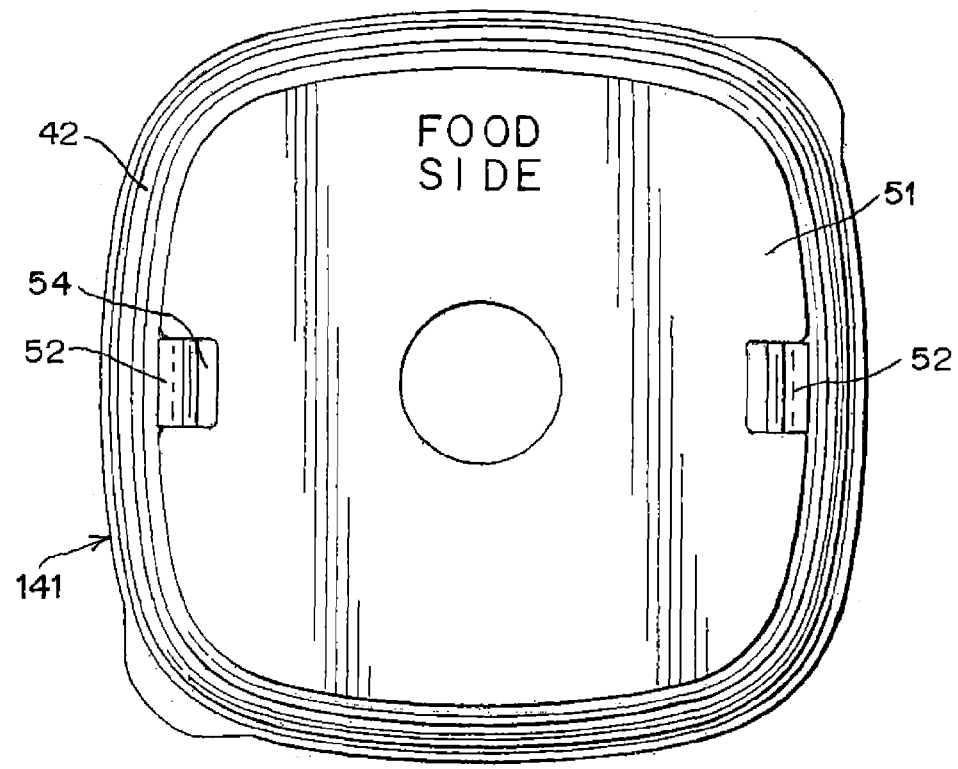
FIG. 6 is an bottom plan view of an embodiment of a lid with a temperature-maintenance block (its FOOD SIDE) releasably secured to the inside bottom of the lid.
Figure 7:
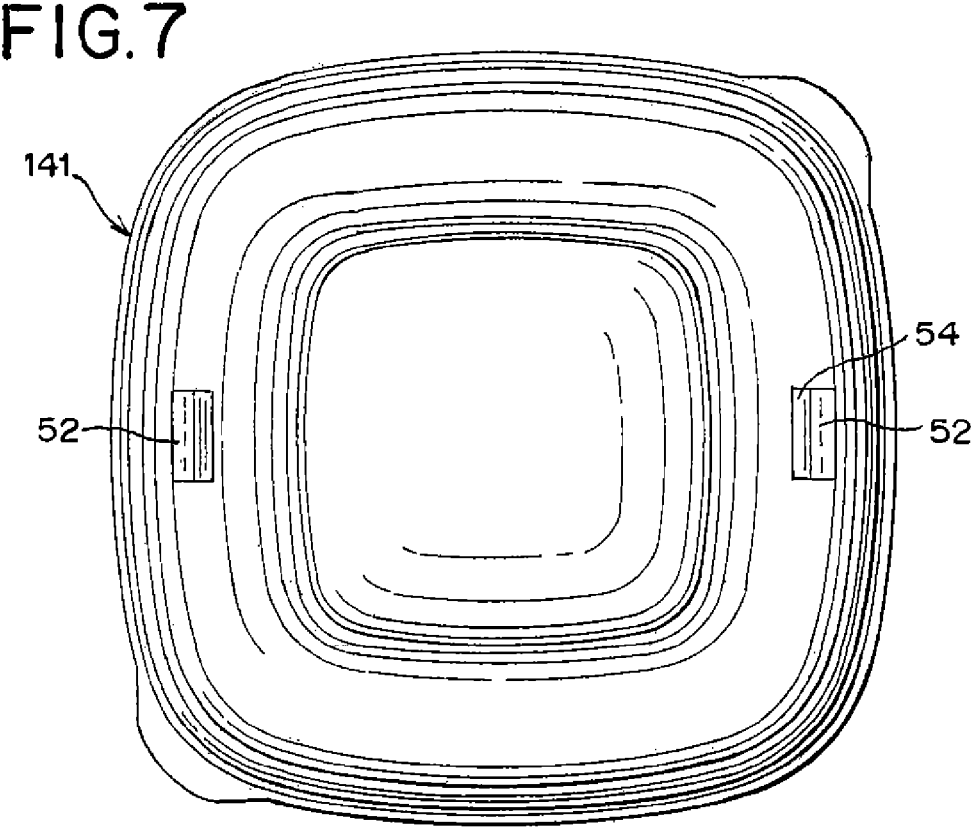
FIG. 7 is a bottom plan view along the lines of FIG. 6, but with the temperature-maintenance block removed.

The lid of this embodiment, generally designated at 41, has a groove 42 (FIG. 6) within which the lip 36 of the container is received by virtue of which the lid is secured to the container. The top wall or upper outer surface of the lid 41 features a raised panel 43 having a sidewall member 44 that spaces the raised panel outwardly away from upper outer surface 45 of the lid. The entirety of the upper outer surface 45 need not be spaced away from the raised panel 43 or its sidewall member 44. For example, in the illustrated embodiment, the lid includes a peripheral channel 46 that provides clearance at the locations of the raised panel 42 to allow passage of the outwardly projecting flange or flanges when a container bottom wall 34 is attached to a sidewall member of the raised panel 43, as described more fully herein. In this arrangement, the peripheral channel is surrounded by a peripheral surface 47 that is raised above the peripheral channel 46 and typically no higher than, often lower than, the raised panel 43. The provision of such a peripheral surface 47 is structured so as to not interfere with the ability of the raised panel and its sidewall member to attachingly engage the flange or flanges of the container 32.

FIG. 6 through FIG. 14 depict an embodiment by which a temperature-maintenance block 51 is positioned at the underside or bottom surface of lid 141 by means of a hook 52 that downwardly depends from inside of the lid 141. In the illustrated embodiment, an opposing pair of hooks 52 are utilized, and the temperature-maintenance block 51 is positioned therebetween and held by these hooks 52. Illustrated hook 52 has an outwardly or downwardly projecting arm 53 that includes a barb 54 extending transversely the arm 53, typically at its remote end.

When desired, hook 52 is transversely movable with respect to the inside of the lid 141, being generally cantilevered therefrom. This cantilever arrangement is achieved by a certain flexibility of the arm 53, by a flexibility of a portion of the lid 141 in the vicinity where the arm emanates from the lid, or a combination of such flexibilities in order to impart lateral or transverse movement of the hook 52 with respect to the lid. The resulting movability of the hook 52 and especially of the barb 54 facilitates insertion of the temperature-maintenance block 51 onto the lid and removal from the lid. Insertion and removal of the temperature-maintenance block 51 from the lid 141 are thereby facilitated.

In typical use, the temperature-maintenance block 51 is stored in an appropriate compartment such as a freezer or heating device until the block reaches a desired temperature. Thereafter, the cooled, frozen or heated block is snapped in place onto the lid, typically between opposing hooks 52. After the container, lid and block combination are put into use, the block eventually reaches ambient temperature or is otherwise deemed ready for thermal treatment, the block is easily moved away from the grasp of the hook 52 and its barb 54 until the block clears the hook or hooks and is again free to position into the freezer, heater or the like.

Figure 8:
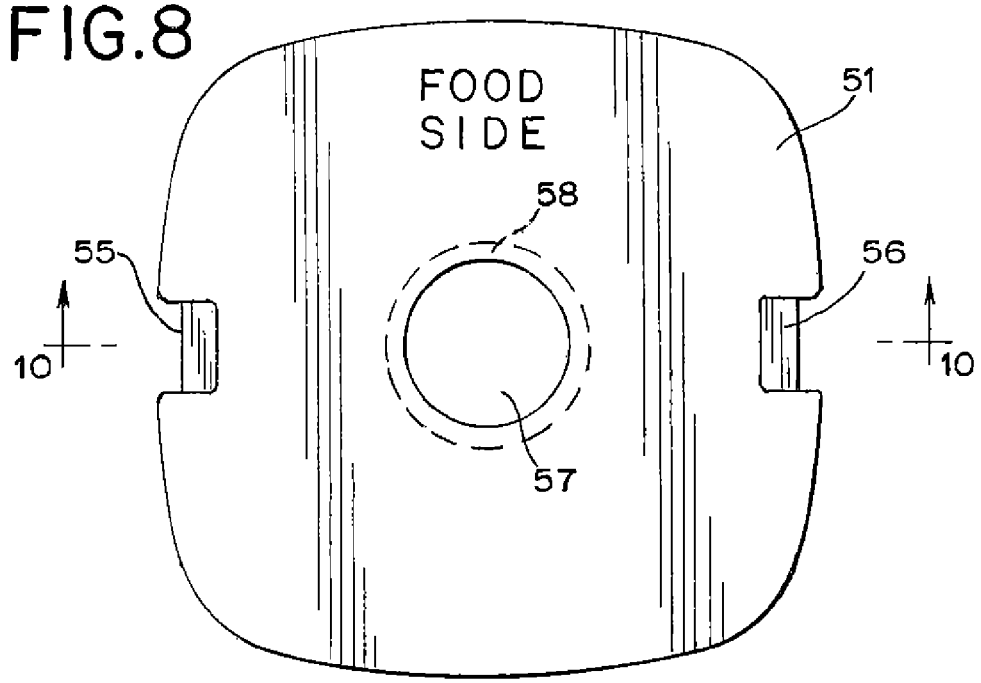
FIG. 8 is a plan view of the FOOD SIDE of the temperature-maintenance block of FIG. 6.

This particular embodiment that is illustrated in FIG. 6 through FIG. 14 incorporates a particular temperature-maintenance block 51 that includes a sidewall indent 55, seen particularly in FIG. 8, FIG. 9 and FIG. 10. This can be, as shown, combined with a food side recess 56, in order to provide a flush and especially secure and compact engagement interface between the lid 141 and the temperature-maintenance block 51.

The illustrated temperature-maintenance block 51 includes a hole 57 therethrough to precipitate its removal and insertion from the lid 141. Typically, this hole 57 is sized and shaped to accommodate a human finger by which digital action is applied as an assist in removing the block from the lid and when desired, for positioning the block on the lid. In this illustrated version, the hole 57 has a chamfered wall 58 to assist in gripping. This is perhaps best seen in FIG. 10.

FIG. 12 through FIG. 16 provide typical further details of this embodiment. The outwardly protruding flange of the outside bottom wall of the container 131 is continuous and extends around the open outside volume of the container in order to define an inside peripheral flange continuous wall 137. In the illustrated embodiment, this flange wall 137 has a footprint that is generally square with rounded corners. This particular shaping coordinates with the raised panel 43 of the lid 41, 141, 241 and if desired lid 481. Other shapes are contemplated, provided the flange 37, flanges and/or flange wall 137 mate and grasp with the lid raised panel 43. In an illustrated embodiment, the sidewall member of the raised panel of the lid is continuous and extends the periphery of the raised panel, although a raised panel and sidewall combination of components can be provided instead of the uninterrupted continuous raised panel arrangement shown.

Figure 13A:
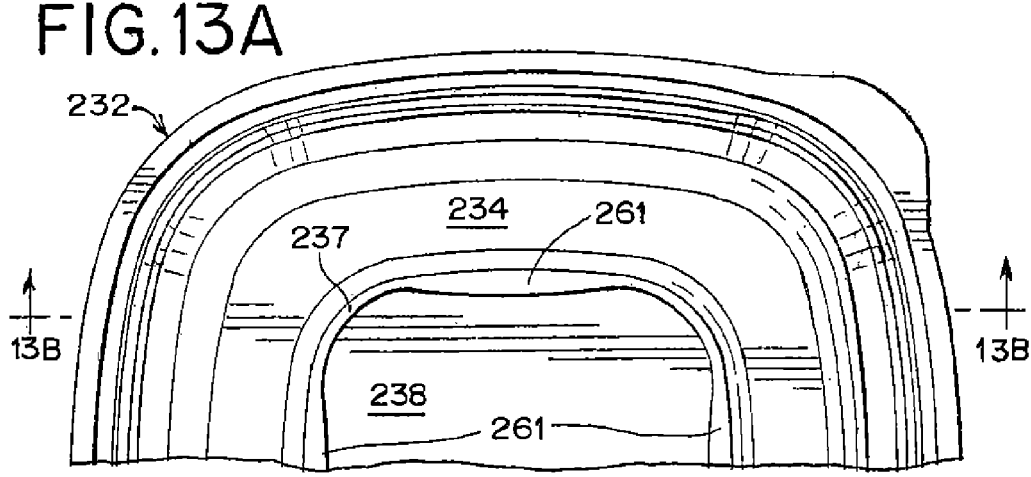
FIG. 13A is a partial bottom plan view of a container illustrating an embodiment.
Figure 13B:
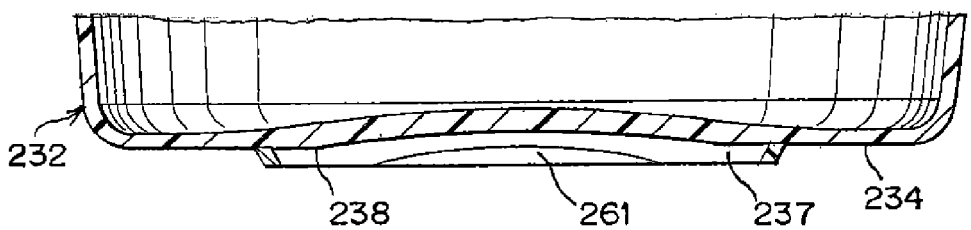
FIG. 13B is a cross-sectional view along the line 13B-13B of FIG. 13A.

FIGS. 13A and 13B illustrate a portion of the bottom of an embodiment of a container 232 generally along the lines of container 32 and having at least one interference member. A plurality of interference members are shown, each including a projection 261 that is inwardly directed along the flange 237 on the bottom wall 234. Flange 237 that is illustrated in these drawings is of the type that is continuous and fully encloses open outside volume 238 of the container 232. When desired, the interference member could have an indented structure rather than or in addition to a projecting structure.

The illustrated inwardly directed projection 261 is curved, having a curved profile along two axes or planes. Projection 261 is curved in a direction parallel to the bottom wall 234 as in FIG. 13A, as well as in a direction transverse to the bottom wall as in FIG. 13B. Its walls are generally curved or tapered so as to provide a smooth transition with the rest of the flange 237, thereby enhancing the strength of the projection 261 by avoiding sharp edge interfaces. Typically this is the case along two axes or planes, one shown in FIG. 13C and the other in FIG. 13D, which typically are perpendicular to each other. In this illustrated embodiment, one of the inwardly directed projections 261 is provided along each of the four lengths of the generally square outwardly projecting flange 237 shown in this particular embodiment.

Figure 13C:
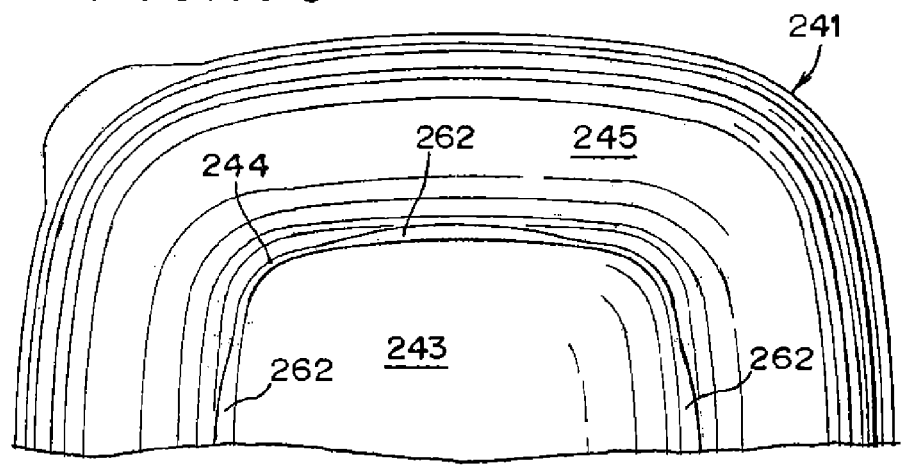
FIG. 13C is a partial top plan view of a lid of an embodiment corresponding to the container embodiment of FIG. 13A and FIG. 13B.
Figure 13D:
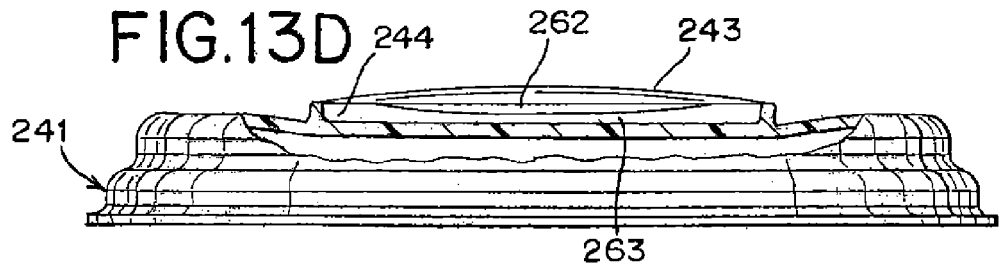
FIG. 13D is an elevation view, partially cut away, of the embodiment illustrated in FIG. 13C.

FIG. 13C and FIG. 13D illustrate lid 241 that is designed to be complementary with and securable to the bottom wall of container 232 that is shown in FIG. 13A and FIG. 13B. Raised panel 243 projects above at least a portion of the upper outer surface 245 of the lid 241 by means of sidewall member 244. In this illustrated embodiment, sidewall member 244 supports interference elements that are designed to interengage with the inwardly directed projections 261 of the container 232. The illustrated interference member of the lid 241 is an outwardly directed projection 262 having a curved profile along two axes or planes. In this embodiment, the lid includes four such outwardly directed projections 262 at locations generally corresponding with locations of the inwardly directed projections 261 of the container bottom wall 234. More specifically, four outwardly directed projections 262 are positioned along each length of the sidewall member 244 of the lid 241. When desired, the interference member could have an indented structure rather than or in addition to a projecting structure.

In this particular arrangement of interengaging inference members depicted in FIG. 13A through FIG. 13D, the inwardly directed projection 261 of the container bottom engages and interferes with the outwardly directed projection 262 of the lid raised panel 243. Upon initial interference engagement, movement of the raised panel of the lid into the open outside volume 238 on the bottom of the container is resisted by virtue of this interference. Relatively low manual pressure applied to the container and/or the lid results in flexing of either the inwardly directed projection 261 or the outwardly directed projection 262, or both, until snapping engagement is achieved. After such snapping engagement, in the illustrated embodiment, the inwardly directed projection 261 of the container bottom is positioned over the outwardly directed projection 262. With this engagement, it can be considered that the inwardly directed projection 261 enters the space 263 (FIG. 13D) along the sidewall 244 that lies under the outwardly directed projection 262.

There should be a balance between the force required to disengage the respective interference members and the container bottom and lid top when compared with the force needed to remove the lid from off of the lip 36 of the container (or "open" the container). Generally, the amount of force needed to remove the raised panel of the lid top from the inside volume on the bottom wall of the container should be less than the force required to remove the lid from the container lip. The objective here is to avoid unintended removal of the lid from a closed container (i.e. unintended container opening) during the process of separating one combination of lid and container from another combination of lid and container.

With respect to the footprint of the outside surface of the raised panel sidewall member 244 of the lid, this should be less than the footprint of the inside surface of the outwardly protruding flange of the container bottom. Correspondingly, it is desirable for joined stacking stability that the external height of the raised panel of the lid is less than the internal height of the open outside volume within the outwardly protruding flange on the bottom outside surface of the container. In each instance, the sizing difference should be close, leaving adequate tolerance due to material thickness and production limitations.

FIG. 14 depicts a container and lid combination 131 and 141 removably attached to another container and lid combination 131 (partially broken away) and 141. This provides a convenient stacking arrangement by virtue of the interengagement approach illustrated and described herein.

Figure 15:
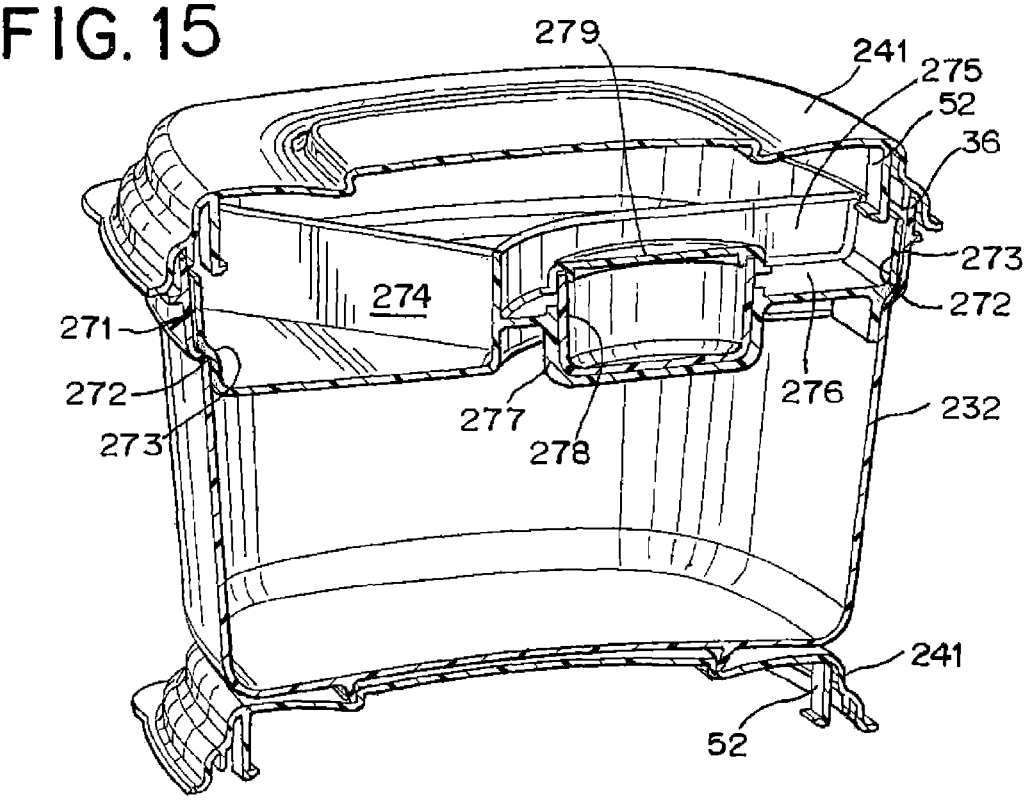
FIG. 15 is a perspective longitudinal cross-sectional view through a combination of a container and two lids, shown with an embodiment of an insert tray within the container.

An insert tray, generally designated at 271, is illustrated in FIG. 15. Insert tray 271 provides an interior space or volume separated from the rest of the container volume. Tray 271 has an outside wall sized and shaped to rest within the container 232 at a desired location along the height of the sidewall of the container 232 providing a stop function. In this illustrated embodiment, this function is achieved by a combination of a ledge 272 along the sidewall of the container 232. Again in this illustrated embodiment, the insert tray 271 has a corresponding indent 273 that can be (as shown) substantially complementary with ledge 272 of the container sidewall.

This insert tray 271 includes a floor from which project a plurality of dividers 274, 275 defining separate compartments within the insert tray. One of the illustrated compartments includes a bottom wall 276 with a well 277 that accommodates a cup 278 having an openable lid 279. It will be appreciated that various different food items can be separately positioned in the compartments, with the cup 278 being especially suitable for liquid contents. The openable lid can be attached by a living hinge.

Figure 16:
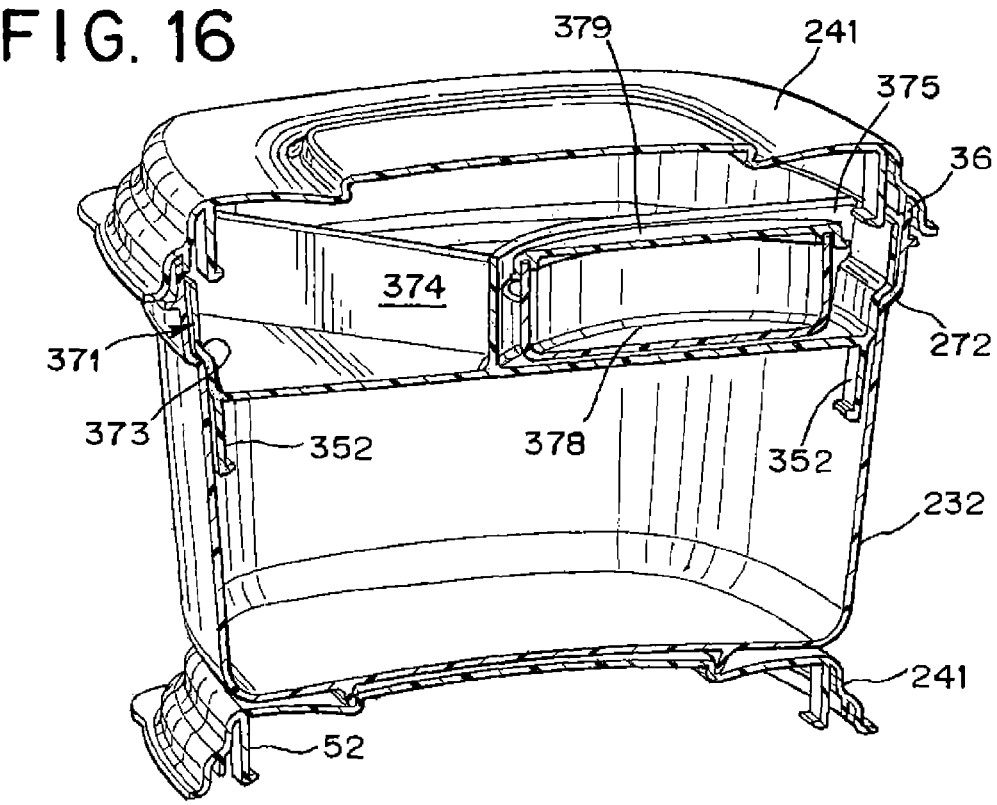
FIG. 16 is a perspective longitudinal cross-sectional view, similar to FIG. 15 but including a different embodiment of insert tray within the container.
Figure 17:
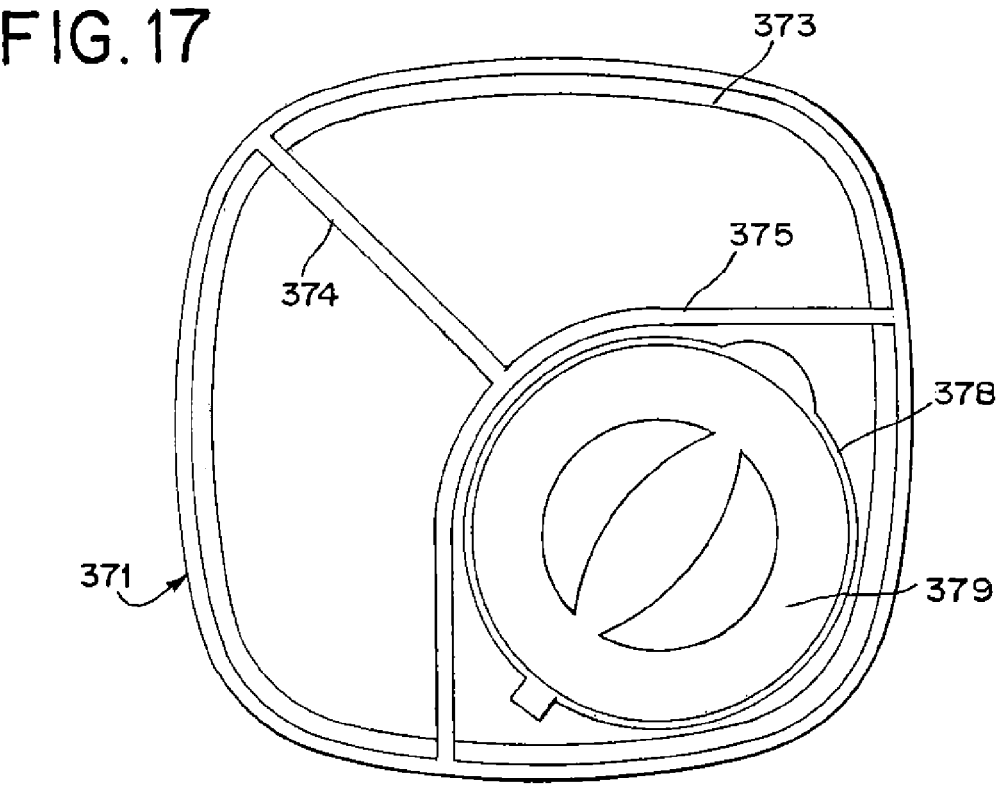
FIG. 17 is a top plan view of the embodiment of insert tray that is depicted in FIG. 16.
Figure 18:
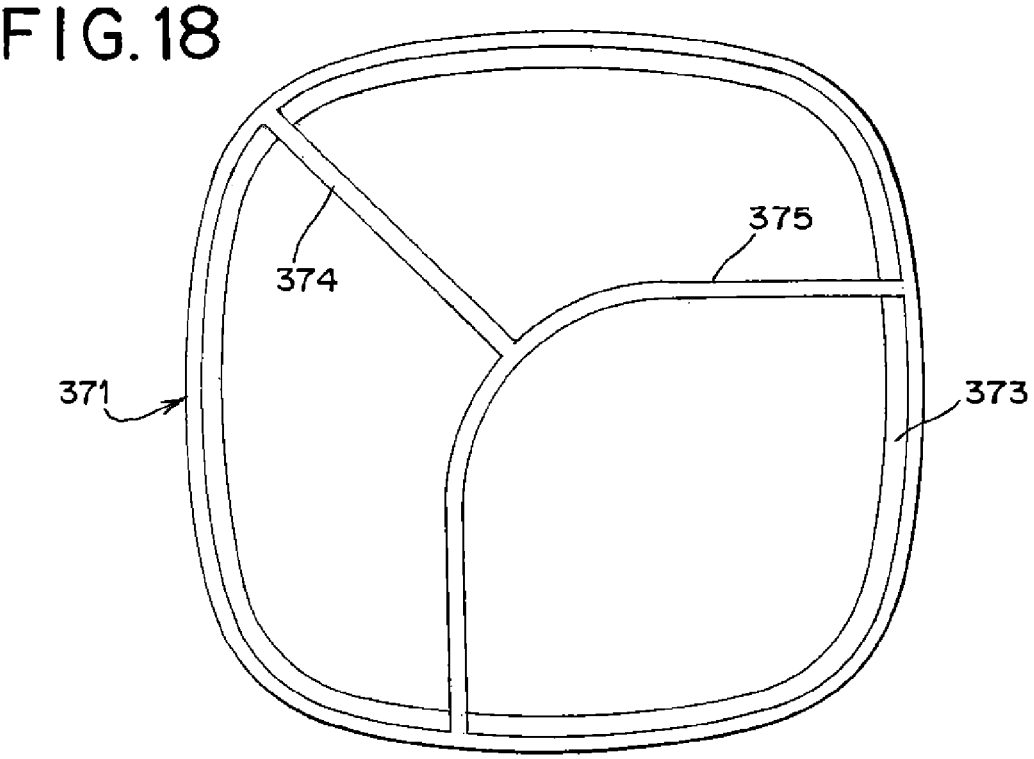
FIG. 18 is a top plan view as in FIG. 17 but with the removable and closeable cup seen in FIG. 17 omitted.

FIG. 16 illustrates another insert tray 371 having an indent 373 engaging ledge 272 of the container 232 thereby providing a stop function that assures proper positioning of the insert tray 371 within the container 232. Tray 371 includes a plurality of dividers 374, 375, as well as a cup 378 with a closeable lid 379. In this embodiment, the cup rests on a bottom surface of one of the compartments thereby demarcated. Further details of the tray 371, the compartments and the cup with a living hinge attached lid are seen in FIG. 17 and FIG. 18.

Figure 19:
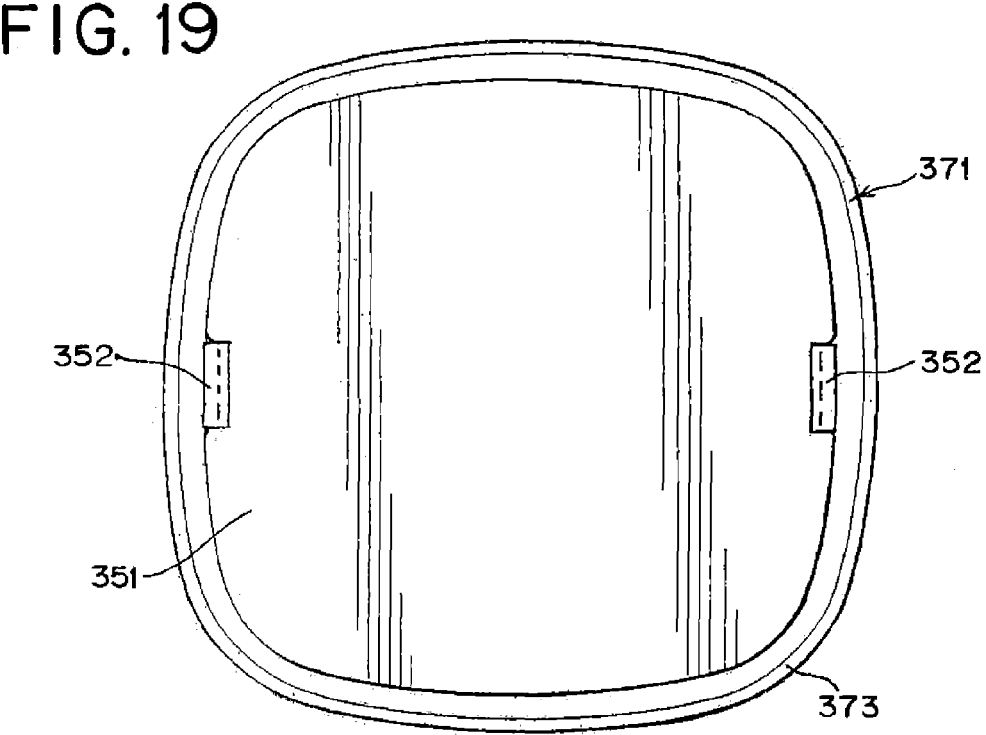
FIG. 19 is a bottom plan view of the insert tray depicted in FIG. 16 without a temperature maintenance block secured thereonto.
Figure 20:
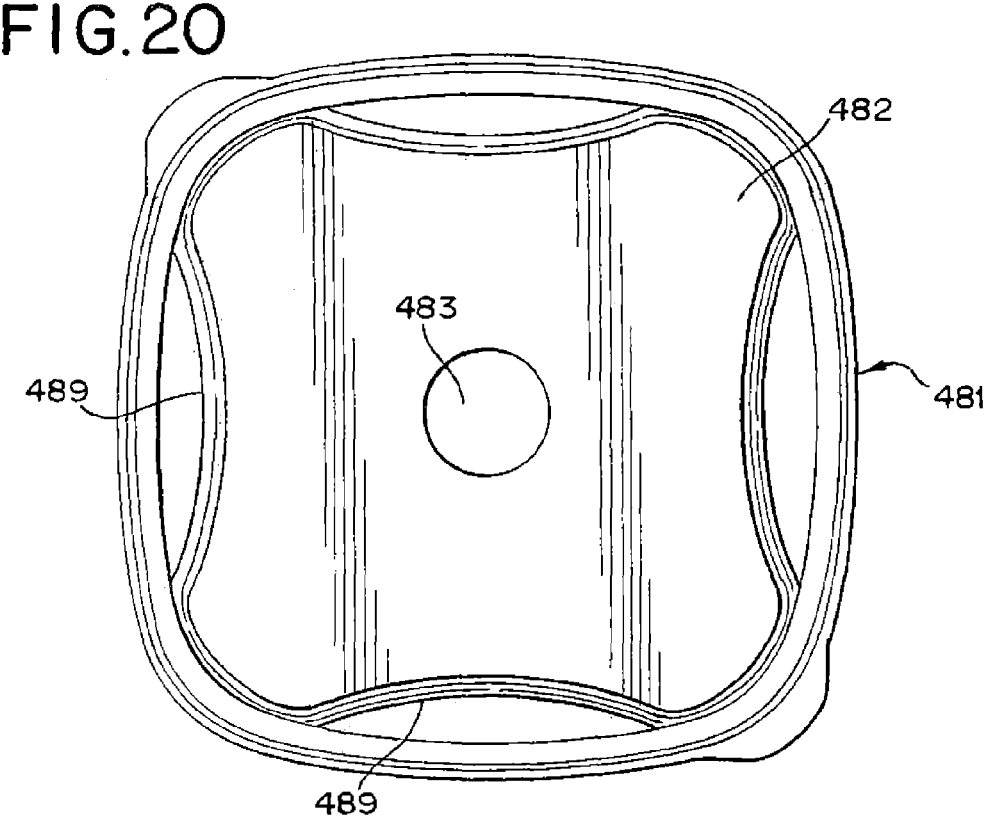
FIG. 20 is a bottom plan view of an alternative combination lid and temperature-maintenance block.
Figure 21:
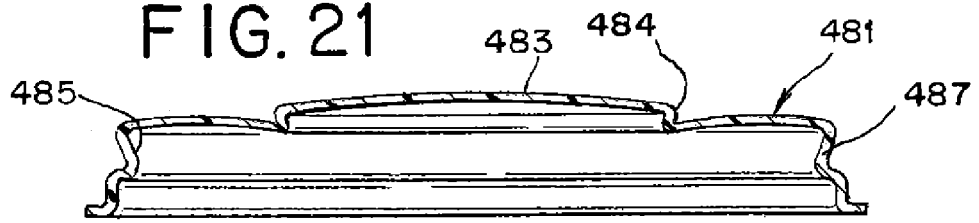
FIG. 21 is a cross-sectional view of the lid depicted in FIG. 20, with the temperature-maintenance block removed.
Figure 22:
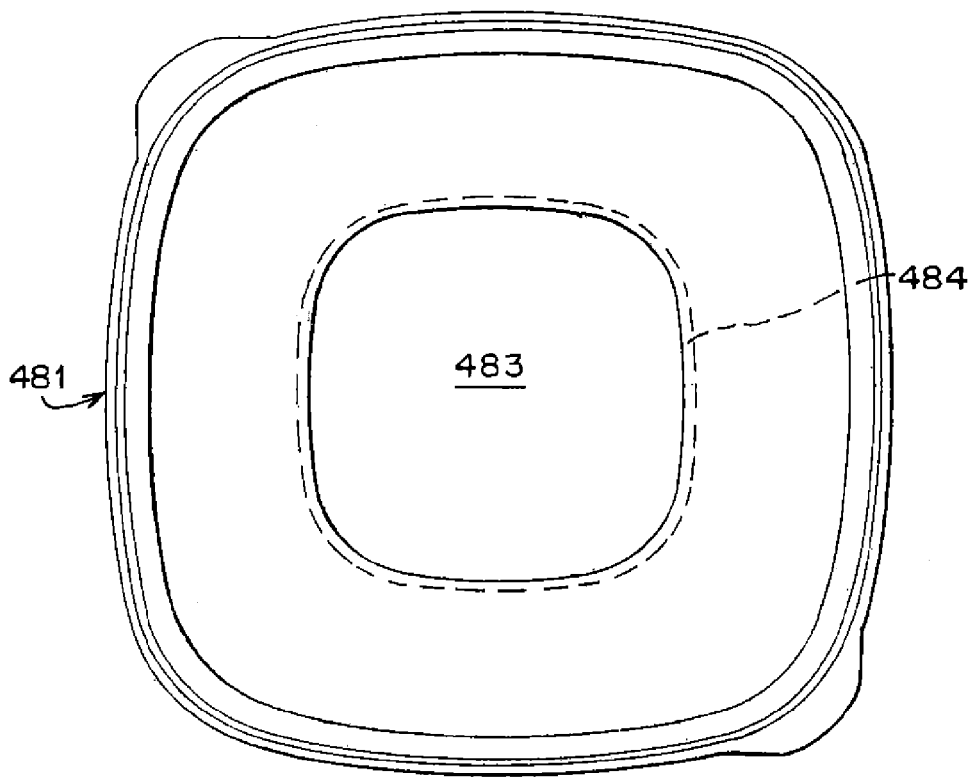
FIG. 22 is a bottom plan view of the lid of FIG. 20, shown with the temperature-maintenance block removed.

Insert tray 371 includes hooks 352 that are provided to suspend a temperature-maintenance block 351 between the hooks 352. When desired, the details of the temperature-maintenance block 351 and of the hooks 352 can follow those of temperature-maintenance block 51 and hooks 52 described herein with respect to the lid of the combination. These features are illustrated in FIG. 19.

FIG. 20 through FIG. 26 illustrate a further embodiment for mounting a temperature-maintenance block to the inside under surface of a lid. Included is a lid, generally designated at 481, and a temperature-maintenance block 482 that is adapted, sized and shaped to be removably secured to the underneath of the lid 481. Lid 481 includes a raised panel 483 having features and functions of the raised panel discussed herein, including the incorporation of a sidewall member 484. When desired, at least one interference member as generally discussed herein can be included in association with the sidewall member 484.

Figure 23:
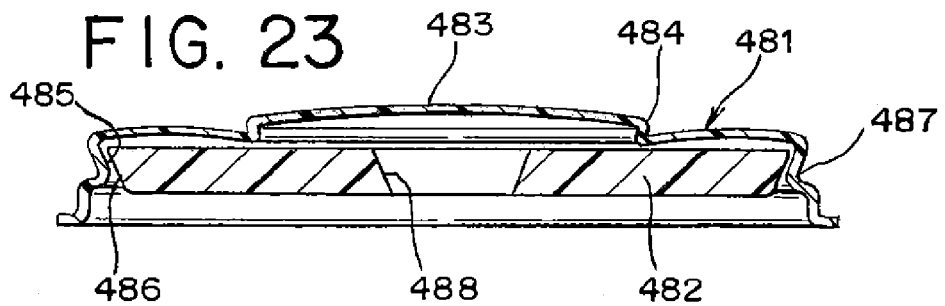
FIG. 23 is a cross-sectional view of the lid and temperature-maintenance block of the embodiment in accordance with FIGS. 20-23.
Figure 24:
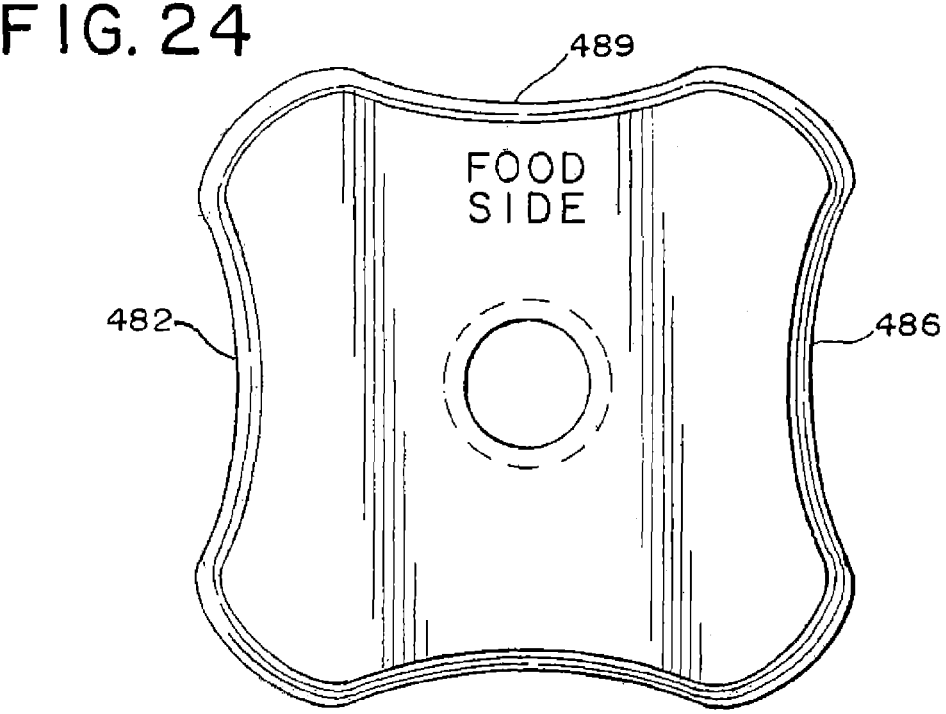
FIG. 24 is a plan view of the bottom FOOD SIDE view of the temperature-maintenance block of FIG. 20.
Figure 25:
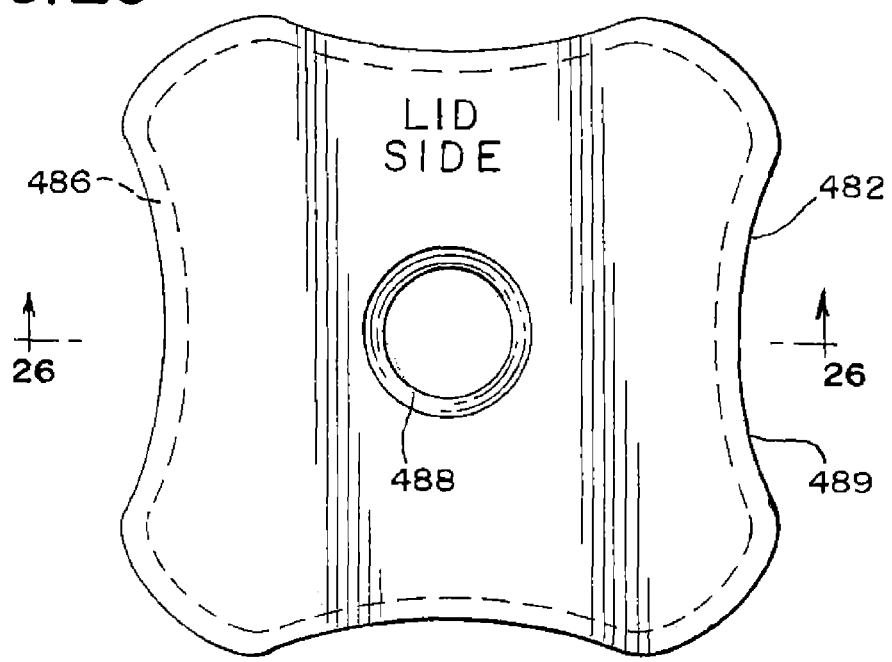
FIG. 25 is a plan view of the top LID SIDE view of the temperature-maintenance block of FIG. 20.
Figure 26:
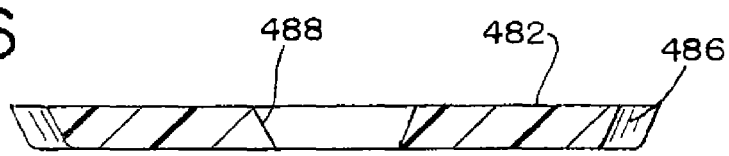
FIG. 26 is a cross-sectional view of the FIG. 20 temperature-maintenance block, along the line 26-26 of FIG. 25.

Lid 481 includes undercut channel 485, which typically extends throughout the full periphery of the internal volume of the lid 481. Interrupted undercuts also are possible, such as being present only at the corners of the lid when the lid is generally rectangular. Temperature-maintenance block 482 has a tapered edge 486 that is adapted, sized and shaped to be complementary with the undercut channel 485 of the lid. This relationship is generally illustrated in FIG. 23. Adequate flexibility is provided in the sidewall 487 of the lid, in the temperature-maintenance block 482, or both, which allows for clicking engagement between the lid and the temperature-maintenance block at the interface between the undercut channel 485 and the tapered edge 486. As is evident from FIG. 24 and FIG. 25, the tapered edge 486 tapers inwardly from the lid side to the food side of the temperature-maintenance block 482.

In addition, a chamfered wall 488 can be provided which surrounds a hole for applying digital grasping forces to facilitate insertion and removal of the temperature-maintenance block 482 from the lid 481. This action is further facilitated by providing at least one chamfered wall saddle 489 along a length of the block 482 to facilitate digital access to the block 482.

Numerous variations are possible for the multiple embodiments discussed herein. For example, the sidewalls of the container can be a single thickness of material, typically polymeric material; alternatively, the sidewalls can provide insulative properties in accordance with container structures that have thermal and/or radiant energy transmission deterrence properties designed to maintain temperatures, whether elevated or reduced vis-à-vis ambient temperature for contents such as soups, cold drinks and the like. Also, for containers that do not contemplate the use of an insert tray, the sidewalls can be generally uninterrupted from top to bottom and not include an indent or the like that can in some embodiments be included to perform a stop function for an insert tray.

In other alternatives, the temperature-maintenance block may be substantially solid, may be a liquid-filled sealed envelope, or any other structure. They may be constructed of and/or contain any other material or materials alone or in combination that will retain either a lowered temperature condition or a raised temperature condition when subjected to an oven or a freezer or the like.

It will further be appreciated that the containers and lids can be provided in any number of volumes with variations in transverse cross-sectional area, footprint, wall height and the like. Even with such variations, the present development allows for secure stacking of differently sized and shaped containers and their lids, provided each such container and lid have the complementary interengagement features described. For example, each such container bottom wall outside surface has the same outside volume and lip configuration and sizing, and each such lid has the same raised panel configuration and sizing such that any one container bottom (including of differently sized and shaped containers) can be secured to any one lid top (including differently sized and shaped lids) with the type of snapping or clicking engagement described herein.

It will be understood that the embodiments described above are illustrative of some of the applications of the principles of the present subject matter. Numerous modifications may be made by those skilled in the art without departing from the spirit and scope of the claimed subject matter, including those combinations or features that are individually disclosed or claimed herein. For these reasons, the scope hereof is not limited to the above description but is set forth in the following claims, and it is understood that the claims may be directed to the features hereof, including as combinations of features that are individually disclosed or claimed herein.

The invention claimed is:

1. A container and lid combination for household use, comprising:
   an open-mouthed household container having a sidewall and a bottom wall defining an inside volume and an open mouth for accommodating and containing products, particularly food or beverage products, the sidewall having an upstanding peripheral lip opposite the bottom wall;
   a lid for closing the household container, the lid being separate from and unhinged to the container, the lid having a lower inner surface and a groove sealingly engageable with the peripheral lip of the container;
   the container having a bottom outer surface, the container bottom outer surface having an outwardly protruding flange and an open outside volume inward of the flange, the flange having an inside surface;
   the lid has an upper outer surface, the upper outer surface having a raised panel, the raised panel having a sidewall that spaces the raised panel outwardly from at least a portion of the lid upper outer surface, the sidewall having an outside surface;
   at least one of the inside surface of the outwardly projecting flange of the container or the outside surface of the sidewall of the lid has an interference member; and
   the container bottom releasably secures to the lid top in both lateral and longitudinal directions, the open outside volume of the container bottom outer surface being adapted, sized and shaped to closely receive the raised panel of the lid upper outer surface such that the interference member is a component of snapping or clicking engagement and longitudinal releasable securement between the container bottom flange and the lid raised panel.

2. The combination of claim 1, wherein said lid includes a temperature-maintenance block and an engagement member of its said lower inner surface, whereby interaction between the engagement member and the block removably affixes the block to the lid, the temperature-maintenance block having a food side that faces the inside volume of the container and a lid side that faces the lower inner surface of the lid.

3. The combination of claim 2, wherein the engagement member is a flexible hook projecting away from said lower inner surface of the lid, which hook has a barb that is transversely movable outwardly to accommodate longitudinal movement of the temperature maintenance block and moves transversely inwardly and removably engages the temperature maintenance block.

4. The combination of claim 3, wherein the temperature-maintenance block has a sidewall indent within which the hook lies and a food side indent within which the barb of the hook lies.

5. The combination of claim 2, wherein the engagement member is an undercut within the lower surface of the lid, which undercut removably engages an edge of the temperature-maintenance block.

6. The combination of claim 5, wherein the temperature-maintenance block has a tapered edge whereby the block is wider at its lid side than at its food side such that the wider portion of the tapered edge fits within the undercut of the lid to removably hold the block to the lower inner surface of the lid.

7. The combination of claim 2, wherein the temperature-maintenance block has a hole therethrough that is sized and shaped to accommodate human digit action by which the block is removed from the lid.

8. The combination of claim 1, wherein the outwardly protruding flange of the container is continuous and extends around the open outside volume of the container to provide an inside peripheral wall on the outside bottom of the container, which inside peripheral wall defines the bounds of the open outside volume.

9. The combination of claim 1, wherein the sidewall of the raised panel of the lid is continuous and extends the periphery of the raised panel.

10. The combination of claim 8, wherein the sidewall of the raised panel of the lid is continuous and extends the periphery of the raised panel to define an outer peripheral wall of the lid panel, and the outer peripheral wall of the lid panel fits within the inside peripheral wall of the outside bottom of the container and in close proximity such that the interference member engages an opposing location on the container outwardly protruding flange or sidewall of the lid raised panel.

11. The combination of claim 1, wherein the interference member is an inwardly directed interference protrusion from the flange of the container bottom, the inwardly directed interference protrusion engaging the sidewall of the raised panel of the lid.

12. The combination of claim 1, wherein the interference member is an outwardly directed interference protrusion from the sidewall of the raised panel of the lid, the outwardly directed interference protrusion engaging the flange of the container bottom.

13. The combination of claim 1, including more than one said interference member as a pair of inter-engaging interference members, one interference member of the pair being an inwardly directed interference protrusion from the flange of the container bottom that engages another interference member of the pair being an outwardly directed interference protrusion from the sidewall of the raised panel of the lid, one of the respective interference projections rides over and rests below the other interference projection for said snapping or clicking engagement and longitudinal releasable securement.

14. The combination of claim 13, including more than one said pair of inter-engaging interference members along the outwardly protruding flange of the container and along the sidewall member of the lid.

15. The combination of claim 13, wherein each interference protrusion of the pair of inter-engaging interference members has a gradually curved profile along two axes or planes that are generally perpendicular to each other.

16. The combination of claim 1, wherein the sidewall, bottom wall or both of the open-mouthed container is insulated against thermal transmission therethrough.

17. The combination of claim 1, further including an insert tray of the container, the insert tray sized and shaped to enter the container through its open mouth, the tray having a floor and providing an interior volume separate from the inside volume of the container, the container sidewall having a stop at a location that engages the insert tray whereby the insert tray is positioned at a desired height along the container sidewall.

18. The combination of claim 17, further including a temperature-maintenance block and an engagement member of the insert tray floor, which engagement member removably supports the block from the bottom of the insert tray.

19. The combination of claim 2, further including an insert tray adapted, sized and shaped to enter the container through its open mouth and be suspended above the bottom wall of the container, the tray having a floor and providing an interior volume separate from the inside volume of the container, further including an additional temperature-maintenance block and an additional engagement member, the additional engagement member being of the insert tray floor, which engagement member removably supports the additional block from the insert tray, whereby two separate temperature-maintenance blocks are supported within the inside volume of the container, one from the lid and the other from the insert tray.

20. A container and lid combination for household use, comprising:
- an open-mouthed container for household use, the container having a sidewall and a bottom wall defining an inside volume and an open mouth for accommodating and containing products, particularly food or beverage products, the sidewall having an upstanding peripheral lip opposite the bottom wall;
- a lid for closing the container for household use, the lid being separate from and unhinged to the container, the lid having a lower inner surface and a groove sealingly engageable with the peripheral lip of the container;
- the container having a bottom outer surface, the container bottom outer surface having an outwardly protruding flange and an open outside volume inward of the flange, the flange having an inside surface;
- the lid has an upper outer surface, the upper outer surface having a raised panel, the raised panel having a sidewall that spaces the raised panel outwardly from at least a portion of the lid upper outer surface, the sidewall having an outside surface;
- at least one of the inside surface of the outwardly projecting flange of the container or the outside surface of the sidewall of the lid has an interference member;
- the container bottom releasably secures to the lid top in both lateral and longitudinal directions, the open outside volume of the container bottom outer surface being adapted, sized and shaped to closely receive the raised panel of the lid upper outer surface such that the interference member is a component of snapping or clicking engagement and longitudinal releasable securement between the container bottom flange and the lid raised panel;
- a temperature-maintenance block and an engagement member of said lower inner surface of the lid, whereby interaction between the engagement member and the block removably affixes the block to the lid, the temperature-maintenance block having a food side that faces the inside volume of the container and a lid side that faces the lower inner surface of the lid; and
- more than one said interference member provides a pair of inter-engaging interference members, one interference member of the pair being an inwardly directed interference protrusion from the inside surface of the flange of the container bottom that engages another interference member of the pair being an outwardly directed interference protrusion from the outside surface of the sidewall of the raised panel of the lid, one of the respective interference projections rides over and rests below the other interference projection for said snapping or clicking engagement and longitudinal releasable securement.

21. A container and lid combination for household use, comprising:
- an open-mouthed container for household use having a sidewall and a bottom wall defining an inside volume and an open mouth for accommodating and containing products, particularly food or beverage products, the sidewall having an upstanding peripheral lip opposite the bottom wall;
- a lid for closing the container for household use, the lid being separate from and unhinged to the container, the lid having a lower inner surface and a groove sealingly engageable with the peripheral lip of the container;
- the container having a bottom outer surface, the container bottom outer surface having an outwardly protruding flange and an open outside volume inward of the flange, the flange having an inside surface;
- the lid has an upper outer surface, the upper outer surface having a raised panel, the raised panel having a sidewall that spaces the raised panel outwardly from at least a portion of the lid upper outer surface, the sidewall having an outside surface;
- each of the inside surface of the outwardly projecting flange of the container and the outside surface of the sidewall of the lid has an interference member;
- the container bottom releasably secures to the lid top in both lateral and longitudinal directions, the open outside volume of the container bottom outer surface being adapted, sized and shaped to closely receive the raised panel of the lid upper outer surface such that the interference member is a component of snapping or clicking engagement between the container bottom flange and the lid raised panel;
- said interference members provide a pair of inter-engaging interference members, one interference member of the pair being an inwardly directed interference protrusion from the inside surface of the flange of the container bottom that engages another interference member of the pair being an outwardly directed interference protrusion from the outside surface of the sidewall of the raised panel of the lid, one of the respective interference projections rides over and rests below the other interference projection for said snapping or clicking engagement and longitudinal releasable securement; and each interference protrusion of the pair of inter-engaging interference members is a protrusion having a gradually curved profile along two axes or planes that are generally perpendicular to each other.

\* \* \* \* \*